US012761883B2

(12) United States Patent
Bar et al.

(10) Patent No.: US 12,761,883 B2
(45) Date of Patent: Oct. 13, 2026

(54) SECURING SOFTWARE DEVELOPMENT CYCLES WITH ARTIFICIAL INTELLIGENCE CUSTOMIZATION

(71) Applicant: CyberArk Software Ltd., Petach-Tikva (IL)

(72) Inventors: Avishay Bar, Petach-Tikva (IL); Erez Waisbard, Petach-Tikva (IL)

(73) Assignee: CyberArk Software Ltd., Petach-Tikva (IL)

(*) Notice: Subject to any disclaimer, the term of this patent is extended or adjusted under 35 U.S.C. 154(b) by 254 days.

(21) Appl. No.: 18/426,627

(22) Filed: Jan. 30, 2024

(65) Prior Publication Data

US 2025/0244965 A1 Jul. 31, 2025

(51) Int. Cl.
*G06F 8/35* (2018.01)
*G06F 40/20* (2020.01)

(52) U.S. Cl.
CPC ................ *G06F 8/35* (2013.01); *G06F 40/20* (2020.01)

(58) Field of Classification Search
CPC .................................. G06F 8/35; G06F 40/20
See application file for complete search history.

(56) References Cited

U.S. PATENT DOCUMENTS

| | | | | |
|---|---|---|---|---|
| 11,379,219 | B2 | 7/2022 | Bhalla et al. | |
| 2020/0091748 | A1 | 3/2020 | Chien | |
| 2022/0277008 | A1* | 9/2022 | Bordawekar | G06N 20/00 |
| 2022/0326917 | A1* | 10/2022 | Chintala | G06F 8/38 |

OTHER PUBLICATIONS

Leonardo Martin, "Leveraging Large Language Models for Efficient Failure Analysis in Game Development" (Year: 2024).*
De Lima et al. "Learning Risk Factors from App Reviews: A Large Language Model Approach for Risk Matrix Construction" (Year: 2023).*
Sousa et al., "Applying Machine Learning to Estimate the Effort and Duration of Individual Tasks in Software Projects" (Year: 2023).*
OWASP Threat Dragon, 1 page, https://www.threatdragon.com/#/ (accessed on Jan. 25, 2024).

(Continued)

*Primary Examiner* — Phillip H Nguyen
(74) *Attorney, Agent, or Firm* — FINNEGAN, HENDERSON FARABOW, GARRETT & DUNNER, LLP

(57) ABSTRACT

Techniques are provided for securing software development cycles with artificial intelligence customization. Operations may include identifying a software generation task; providing the software generation task to a language model; identifying, from the language model, a plurality of queries associated with specific attributes of the software generation task; creating, based on the software generation task and responses to the plurality of queries, a reconstructed software generation task; assigning, based on a machine learning model, one or more security labels to the reconstructed software generation task; determining one or more prioritization scores for one or more security rules based on the one or more security labels; and generating, based on the one or more prioritization scores, at least one security action for the reconstructed software generation task.

20 Claims, 5 Drawing Sheets

(56) References Cited

OTHER PUBLICATIONS

OWASP Threat Dragon—Main, OWASP Foundation, 4 pages, https://owasp.org/www-project-threat-dragon/ (accessed on Jan. 25, 2024).
OWASP Threat Dragon—Description, OWASP Foundation, 4 pages, https://owasp.org/www-project-threat-dragon/ (accessed on Jan. 25, 2024).
OWASP/threat-dragon, GitHub, 5 pages, https://github.com/OWASP/threat-dragon (accessed on Jan. 25, 2024).
Microsoft Threat Modeling Tool, Aug. 25, 2022, Microsoft Learn, 2 pages, https://learn.microsoft.com/en-us/azure/security/develop/threat-modeling-tool (accessed on Jan. 25, 2024).
Threat Modeling, Microsoft, 3 pages, https://www.microsoft.com/en-us/securityengineering/sdl/threatmodeling (accessed on Jan. 25, 2024).
Getting started with the Threat Modeling Tool, Aug. 25, 2022, Microsoft Learn, 9 pages, https://learn.microsoft.com/en-us/azure/security/develop/threat-modeling-tool-getting-started (accessed on Jan. 25, 2024).
Alexander S. Gillis, Cloud Security Posture Management (CSPM), TechTarget, 5 pages, https://www.techtarget.com/searchsecurity/definition/Cloud-Security-Posture-Management-CSPM (accessed on Jan. 25, 2024).
What is CSPM?, Microsoft, 5 pages, https://www.microsoft.com/en-us/security/business/security-101/what-is-cspm (accessed on Jan. 25, 2024).
What Is Cloud Infrastructure Entitlement Management (CIEM)?, Palo Alto Networks, 10 pages, https://www.paloaltonetworks.com/cyberpedia/what-is-ciem (accessed on Jan. 25, 2024).
What Is Cloud Infrastructure Entitlement Management (CIEM)?, zscaler, 5 pages, https://www.zscaler.com/resources/security-terms-glossary/what-is-ciem (accessed on Jan. 25, 2024).
Static program analysis, Wikipedia, 6 pages, https://en.wikipedia.org/wiki/Static_program_analysis (accessed on Jan. 25, 2024).
Alan Richardson, What is static analysis?, Feb. 1, 2021, Secure Code Warrior, 15 pages, https://www.securecodewarrior.com/article/what-is-static-analysis (accessed on Jan. 25, 2024).
Abstract syntax tree, Wikipedia, 4 pages, https://en.wikipedia.org/wiki/Abstract_syntax_tree (accessed on Jan. 25, 2024).
Dominik Kundel, ASTs—What are they and how to use them, Jun. 11, 2020, twilio, 9 pages, https://www.twilio.com/blog/abstract-syntax-trees (accessed on Jan. 25, 2024).
Large language model, Wikipedia, 24 pages, https://en.wikipedia.org/wiki/Large_language_model (accessed on Jan. 25, 2024).
OWASP Top Ten, OWASP Foundation, 5 pages, https://owasp.org/www-project-top-ten/# (accessed on Jan. 25, 2024).
OWASP Application Security Verification Standard 4.0, Mar. 2019, OWASP, 68 pages, https://owasp.org/www-pdf-archive/OWASP_Application_Security_Verification_Standard_4.0-en.pdf.
Mitre ATT&CK, 1 page, https://attack.mitre.org/ (accessed on Jan. 25, 2024).

* cited by examiner

SECURING SOFTWARE DEVELOPMENT CYCLES WITH ARTIFICIAL INTELLIGENCE CUSTOMIZATION

TECHNICAL FIELD

The present disclosure generally relates to the field of software security. More specifically, the present disclosure relates to securing software development cycles with artificial intelligence customization.

BACKGROUND

Software development life cycles may involve processes where software developers go through various steps to create, modify, or deploy software, such as planning, analyzing, designing, implementing, testing, deploying, or maintaining. For the security of developed software, a person having knowledge of the security aspects of software development may review the planned features of the software and provide risk assessment and security guidelines for implementation. Various scenarios may result in inefficiencies in the security review in software development, such as a software developer's insufficient description of planned software features that may require back-and-forth discussion with the security reviewer, or a software developer's unfamiliarity with the security review process that may cause increased transactional cost to software development or even result in insufficient security safeguards in developed software. As the number of software development requests increase, the challenges to ensure security in software development will only further grow.

SUMMARY

In view of the foregoing, embodiments of the present disclosure may provide technical improvements to enhance security in software development processes by, for example, using a streamlined and efficient system to interactively enhance security in software development life cycles based on artificial intelligence customization.

Disclosed embodiments may include systems, methods, apparatuses, and non-transitory computer-readable media for interactively enhancing security in software development life cycles. For example, disclosed embodiments may include operations of identifying a software generation task; providing the software generation task to a language model; identifying, from the language model, a plurality of queries associated with specific attributes of the software generation task; creating, based on the software generation task and responses to the plurality of queries, a reconstructed software generation task; assigning, based on a machine learning model, one or more security labels to the reconstructed software generation task; determining one or more prioritization scores for one or more security rules based on the one or more security labels; and generating, based on the one or more prioritization scores, at least one security action for the reconstructed software generation task. Consistent with disclosed embodiments, non-transitory computer-readable media may store instructions that, when executed by at least one processor, may cause the at least one processor to perform any of the processes described herein.

In accordance with some embodiments, the operations further comprise determining, using the machine learning model, at least one relevancy score for the one or more security labels, wherein the at least one relevancy score indicates a degree of relevancy or prioritization of the one or more security labels to the reconstructed software generation task.

In accordance with some embodiments, assigning the one or more security labels to the reconstructed software generation task is based on the at least one relevancy score.

In accordance with some embodiments, the operations further comprise performing a historical risk analysis for the reconstructed software generation task.

In accordance with some embodiments, the historical risk analysis comprises analyzing historical activity of a user or group associated with the software generation task or the reconstructed software generation task.

In accordance with some embodiments, the operations further comprise assigning one or more scores based on the historical risk analysis.

In accordance with some embodiments, the one or more scores based on the historical risk analysis indicate a number of past instances of a security issue for a user or group associated with the software generation task or the reconstructed software generation task.

In accordance with some embodiments, determining the one or more prioritization scores comprises analyzing, using a model, one or more of: the one or more scores based on the historical risk analysis, industry best practices for security, organization best practices for security, or an input from a user.

In accordance with some embodiments, the software generation task includes at least one of: a software creation task, a software update task, or a software deletion task.

In accordance with some embodiments, the language model comprises a trained language model.

In accordance with some embodiments, the operations further comprise determining the one or more security rules based on the one or more security labels.

In accordance with some embodiments, determining the one or more security rules based on the one or more security labels comprises mapping each of a plurality of security labels to a corresponding set of one or more security rules.

In accordance with some embodiments, the at least one security action comprises a plurality of security actions presented in accordance with a prioritization based on the one or more prioritization scores.

In accordance with some embodiments, generating the at least one security action comprises: determining whether each of the one or more prioritization scores satisfies a threshold; and defining, for each of the one or more security rules whose prioritization score satisfies the threshold, one or more security actions.

In accordance with some embodiments, the machine learning model comprises the language model, another language model, or a classification model.

In accordance with some embodiments, the reconstructed software generation task comprises a plurality of requirements associated with software development.

In accordance with some embodiments, the one or more prioritization scores are based on at least one of: a task classification score or a historical risk analysis score.

In accordance with some embodiments, the operations further comprise implementing the at least one security action based on a code generation engine.

In accordance with some embodiments, the operations further comprise, based on user feedback provided by a software developer or a security reviewer, training or updating at least one of: the language model, the machine learning model, a model configured to map security labels to security rules, a model configured to determine the one or more prioritization scores, or a model configured to conduct a historical risk analysis.

In addition, as disclosed below the processes may be implemented in a computer-implemented method (e.g., performed by executable programming instructions).

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings.

DETAILED DESCRIPTION

Figure 1:
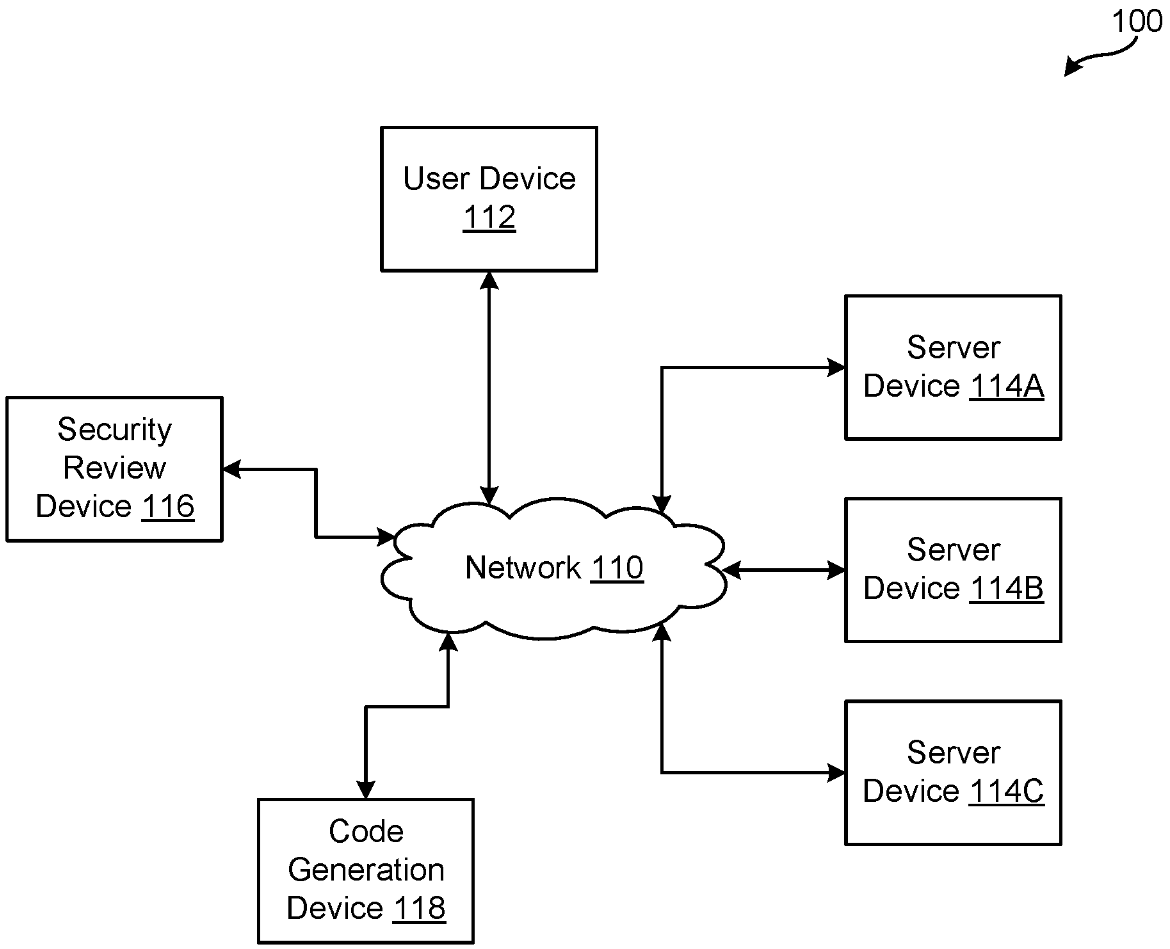
FIG. 1 shows an example system for interactively enhancing security in software development life cycles, consistent with some embodiments of the present disclosure.

The following detailed description refers to the accompanying drawings. Wherever possible, the same reference numbers are used in the drawings and the following description to refer to the same or similar parts. While several illustrative embodiments are described herein, modifications, adaptations, and other implementations are possible. For example, substitutions, additions, or modifications may be made to the components illustrated in the drawings, and the illustrative methods described herein may be modified by substituting, reordering, removing, or adding steps to the disclosed methods. Accordingly, the following detailed description is not limited to the specific embodiments and examples, but is inclusive of general principles described herein and illustrated in the figures in addition to the general principles encompassed by the appended claims.

FIG. 1 shows an example system 100 for interactively enhancing security in software development life cycles, consistent with some embodiments of the present disclosure. The system 100 may include one or more networks (e.g., network 110), one or more user devices (e.g., user device 112), one or more server devices (e.g., server devices 114A, 114B, 114C, etc.), one or more security review devices (e.g., security review device 116), and one or more code generation devices (e.g., code generation device 118). The system 100 may include additional or alternative devices or components, consistent with embodiments of the present disclosure.

The network 110 may connect the user device 112, the server devices 114A, 114B, 114C, the security review device 116, and/or the code generation device 118 (e.g., using interconnected communication links). The network 110 may include one or more of any of various types of networks for communication of information, such as a cellular network (e.g., 2G, 3G, 4G, or 5G), a satellite network, a Wi-Fi network, a WiMAX network, a Bluetooth network, a near-field communication (NFC) network, a low-power wide-area networking (LPWAN) network, a mobile network, a terrestrial microwave network, a wireless ad hoc network, an Ethernet network, a telephone network, a power-line communication (PLC) network, a coaxial cable network, an optical fiber network, and/or the like. The network 110 may include a wired network or a wireless network. The network 110 may include a personal area network, a local area network, a metropolitan area network, a wide area network, a global area network, a space network, or any other type of computer network that may use data connections between network nodes. In some examples, the network 110 may include an Internet Protocol (IP) based network.

The user device 112 may include any type of computing device configured to provide a user (e.g., a software developer or a person involved in developing software) with desired functionalities to interactively enhance security in software development life cycles. The user device 112 may include, for example, an embedded system, a computer, a laptop computer, a desktop computer, a mainframe computer, a tablet, a smart phone, a mobile phone, a mobile device, a server device, a client device, an automotive electronics device, an extended reality headset, a smart watch, an Internet of things (IoT) device, or any other type of computing device.

The server device (e.g., 114A, 114B, 114C, etc.) may include any type of computing device configured to run, execute, implement, or host various functionalities associated with enhancing security in software development life cycles. For example, one or more of the server devices 114A, 114B, 114C may individually or collectively implement one or more models (e.g., machine learning models), processes, or operations configured to interact with a software developer or a person involved in developing software to enhance the security aspects of the software. For example, one or more of the server devices 114A, 114B, 114C may individually or collectively train and/or implement a language model, a classification model, a machine learning model, or any other type of suitable model or operation.

The security review device 116 may include any type of computing device configured to provide input or feedback regarding security of software. For example, a person (e.g., a security administrator or a person having knowledge of software security) may use the security review device 116 to provide input or feedback regarding software security to the models or operations implemented by the server devices 114A, 114B, 114C. In some examples, the provided input or feedback may be used to train, update, or improve the models or operations implemented by the server devices 114A, 114B, 114C. The security review device 116 may include, for example, an embedded system, a computer, a laptop computer, a desktop computer, a mainframe computer, a tablet, a smart phone, a mobile phone, a mobile device, a server device, a client device, an automotive electronics device, an extended reality headset, a smart watch, an Internet of things (IoT) device, or any other type of computing device.

The code generation device 118 may include any type of computing device configured to run, execute, implement, or host various functionalities associated with generating software code. In some examples, the code generation device 118 may be configured to receive descriptions of software functions in a natural language, and to generate software code (e.g., computer-executable instructions) based on the natural-language descriptions, as described in greater detail below. According to some embodiments, code generation device 118 be part of a continuous development, continuous deployment, or DevOps environment. Further, in some embodiments code generation device 118 may be a code versioning system (e.g., Git™, Azure DevOps Server™, AWS CodeCommit™, IBM Rational ClearCase™, etc.) or the like.

In some examples, one or more functionalities as described herein may be implemented using a larger or smaller number of computing devices. For example, the functionalities executed by one or more of the user device 112, the server devices 114A, 114B, 114C, the security review device 116, and/or the code generation device 118 may be implemented by a single computing device, or by multiple computing devices, as desired.

Figure 2:
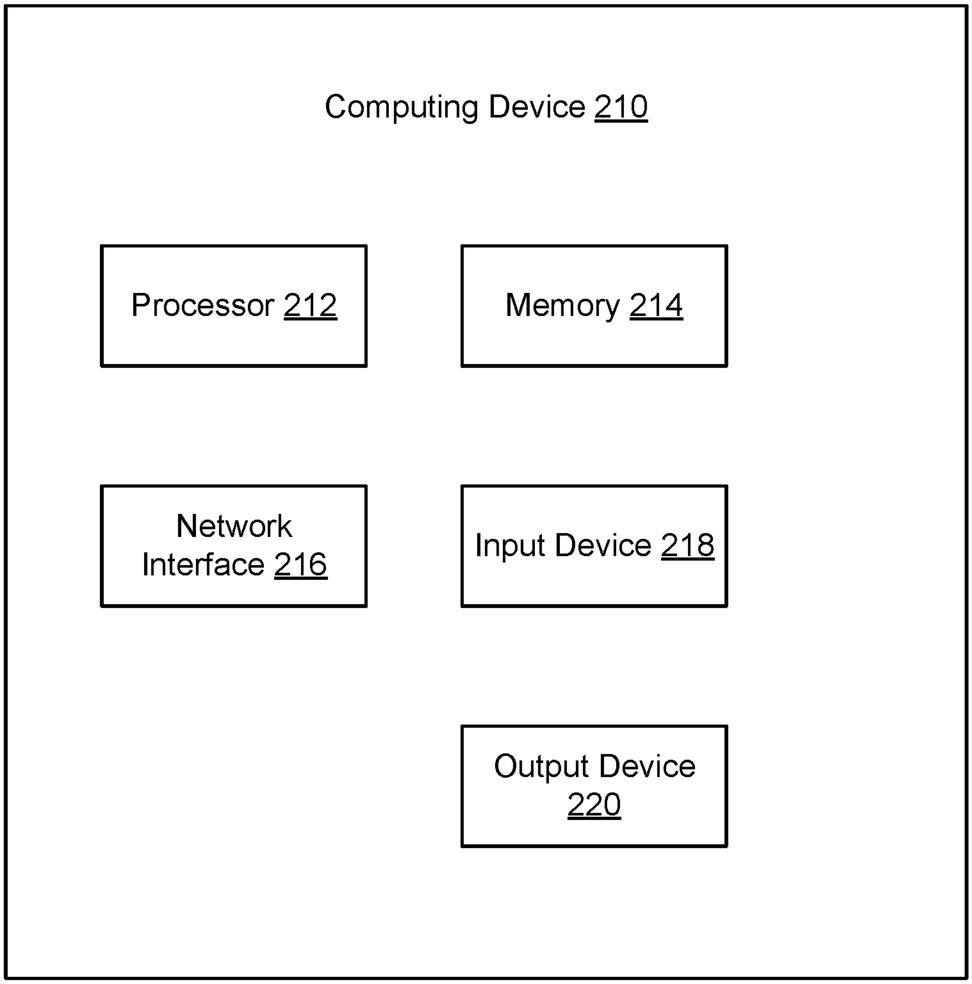
FIG. 2 shows an example computing device, consistent with some embodiments of the present disclosure.

FIG. 2 shows an example computing device 210, consistent with some embodiments of the present disclosure. The computing device 210 may include, for example, at least one processor 212, at least one memory 214, at least one network interface 216, at least one input device 218, and/or at least one output device 220. The devices as described herein (e.g., the user device 112, the server devices 114A, 114B, 114C, the security review device 116, and the code generation device 118 shown in FIG. 1) may similarly include these components and/or may be implemented in a similar manner as the computing device 210. In some examples, the computing device 210 including one or more of the components may be implemented using virtualization technologies and/or cloud computing technologies.

The processor 212 may execute instructions of a computer program to perform any of the functions described herein. The processor 212 may include, for example, integrated circuits, microchips, microcontrollers, microprocessors, central processing units (CPUs), graphics processing units (GPUs), digital signal processors (DSPs), field programmable gate arrays (FPGAs), or other units suitable for executing instructions or performing logic operations. The processor 212 may include a single-core or multiple-core processor (e.g., dual-core, quad-core, or with any desired number of cores). The processor 212 may provide the ability to execute, control, run, or store multiple processes, applications, or programs. In some examples, the processor 212 may be configured to provide parallel processing functionalities to allow a device associated with the processor to execute multiple processes simultaneously. In some examples, the processor 212 may be configured with virtualization technologies. Other types of processor arrangements may be implemented to provide the capabilities described herein.

The memory 214 may include a non-transitory computer-readable medium that may store instructions that, when executed by at least one processor, cause the at least one processor to perform one or more processes as described herein. A non-transitory computer-readable medium may include any type of physical memory on which information or data readable by at least one processor may be stored. A non-transitory computer-readable medium may include, for example, random access memory (RAM), read-only memory (ROM), compact disc read-only memory (CD-ROM), digital versatile discs (DVDs), programmable read-only memory (PROM), erasable programmable read-only memory (EPROM), non-volatile random-access memory (NVRAM), volatile memory, non-volatile memory, hard drives, flash drives, disks, caches, registers, an optical data storage medium, a physical medium with patterns, or networked versions thereof. A non-transitory computer-readable medium may include multiple structures and may be located at a local location or at a remote location.

The network interface 216 may include, for example, a network card, a modem, and/or the like, and may be configured to provide data communication (e.g., two-way data communication) with a network. The network interface 216 may be a wireless interface, a wired interface, or a combination of the two. The specific design and implementation of the network interface 216 may depend on the communication network via which the computing device 210 is intended to operate. For example, the network interface 216 may include a Wireless Local Area Network (WLAN) card, an Integrated Services Digital Network (ISDN) card, a cellular modem, a satellite modem, a modem configured to provide data communication connections via the Internet, a network card with an Ethernet port, a device with radio frequency receivers and transmitters, a device with optical receivers and transmitters, and/or the like. The network interface 216 may be designed to operate via any type of desired network. The network interface 216 may be configured to send and receive electrical, electromagnetic, or optical signals that may represent various types of data.

The input device 218 may include, for example, a keyboard, a mouse, a touch pad, a touch screen, one or more buttons, a joystick, a microphone, and/or any other device configured to detect and/or receive input. In some examples, the input device 218 may include one or more of various types of sensors, such as an image sensor, a temperature sensor, a humidity sensor, a location sensor, or any other type of sensor. The output device 220 may include, for example, a light indicator, a light source, a display (e.g., a light-emitting diode (LED) display, an organic light-emitting diode (OLED) display, a liquid-crystal display (LCD), or a dot-matrix display), a screen, a touch screen, a speaker, a headphone, a device configured to provide tactile cues, and/or any other device configured to provide output.

The memory 214 may store instructions that, when executed by at least one processor, cause the at least one processor to perform one or more processes as described herein. The instructions may include, for example, software instructions, computer programs, computer code, executable instructions, source code, machine instructions, machine language programs, or any other type of directions for a computing device. The instructions may be based on one or more of various types of desired programming languages, and may include (e.g., embody) various processes for interactively enhancing security in software development life cycles as described herein.

Figure 3:
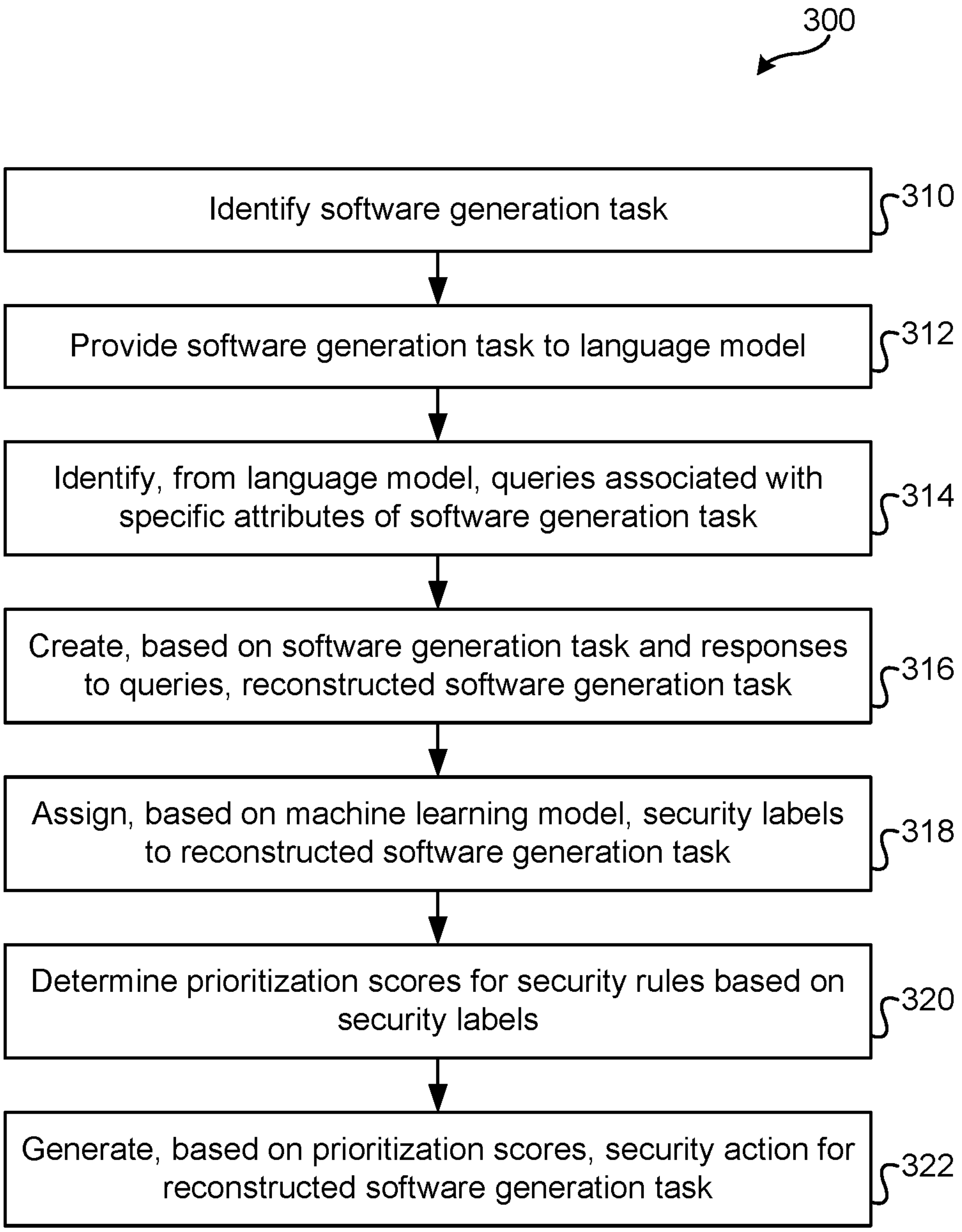
FIG. 3 shows an example method for interactively enhancing security in software development life cycles, consistent with some embodiments of the present disclosure.

Disclosed embodiments, including methods, systems, apparatuses, and non-transitory computer-readable media, may relate to interactively enhancing security in software development life cycles. FIG. 3 shows an example method 300 for interactively enhancing security in software development life cycles, consistent with some embodiments of the present disclosure. With reference to FIG. 3, and as further discussed in detail below, in step 310, one or more computing devices may identify a software generation task. In step 312, the one or more computing devices may provide the software generation task to a language model. In step 314, the one or more computing devices may identify, from the language model, a plurality of queries associated with specific attributes of the software generation task. In step 316, the one or more computing devices may create, based on the software generation task and responses to the plurality of queries, a reconstructed software generation task. In step 318, the one or more computing devices may assign, based on a machine learning model, one or more security labels to the reconstructed software generation task. In step 320, the one or more computing devices may determine one or more prioritization scores for one or more security rules based on the one or more security labels. In step 322, the one or more computing devices may generate, based on the one or more prioritization scores, at least one security action for the reconstructed software generation task.

Disclosed embodiments may include a non-transitory computer readable medium including instructions that, when executed by at least one processor, cause the at least one processor to perform operations for interactively enhancing security in software development life cycles. Software development life cycles may refer to, for example, processes that development personnel, teams, or entities may use to design and build software. Software development life cycles may include, for example, processes for planning, analyzing, designing, implementing, testing, deploying, and/or maintaining software, information systems, programs, or applications. Software development life cycles may help minimize project risks through forward planning, and/or meet customer expectations during production. In some examples, software development life cycles may include requirements analysis, design, development, modification, testing, implementation, deployment, documentation, and/or evaluation.

Security for software may refer to, for example, any type of protection from potential harm to software or information systems or users of the software or information systems. Enhancing security in software development life cycles may include, for example, improving or protecting the confidentiality, availability, or integrity associated with software systems. The security of software may include technologies, processes, and controls configured to protect systems, networks, programs, devices, and/or data from potential harm. The security may include, for example, information security, data security, data privacy, computer security, network security, cyber security, and/or any other type of protection for software or information systems.

Interactively enhancing security in software development life cycles may refer to, for example, interacting with a computing device to enhance security in software development life cycles. For example, a computing device as described herein may be configured to run or implement models (e.g., machine learning models), processes, or operations configured to interact with a developer or a person involved in developing software to enhance the security aspects of the software. A user (e.g., a developer or one or more persons involved in developing software) may interact with the computing device to, for example, receive or determine a description of a task to develop software, enrich the description of the task, obtain prioritized security rules and/or security actions for the task, and/or generate computer-executable code for the software, as described in greater detail below.

Disclosed embodiments may include identifying a software generation task, in accordance with step 310. A software generation task may refer to, for example, an assignment, function, or project to generate software. Software may refer to, for example, a set of computer programs and associated documentation and/or data. Software may be written using, for example, computer-executable code, machine language instructions, programming language instructions, high-level programming code, or any other type of suitable instructions or expressions that may be executed or implemented by a computing device. Software may additionally or alternatively include data, files, documentation, or other information that may be retrieved and/or used to execute the software. The software generation task may include, for example, a task to generate a word processing program, a task to generate an email program, a task to generate a spreadsheet program, a task to generate a presentation program, a task to generate a cloud storage program, a task to generate a password retrieval program, a task to generate a webpage for users who forget their passwords, a task to generate a time keeping program, a task to generate an instant messaging program, a task to generate a networked program, or a task to generate any type of desired program or software. In some examples, the software generation task may be provided in a natural language, in plain free language, in a semi-structured format (that may be derived, for example, from that of the system enabling the creation of the software generation task (such as Jira™)), in a software program code (or pseudo code), or any other desired format.

Identifying the software generation task in step 310 may include receiving a description of the software generation task from a user (e.g., a software developer or a person involved in developing software). For example, a computing device (e.g., user device 112) may provide a display of a user interface to the user, and the user interface may be configured to allow the user to enter a description of the software generation task. The software generation task as entered or input by the user may be received, retrieved, stored, and/or processed (e.g., by a language model as described below).

In some embodiments, the software generation task may include at least one of: a software creation task, a software update task, or a software deletion task. A software creation task may include, for example, a task to create a piece of software or a computer program. A task to create software may include, for example, planning, analyzing, designing, implementing, building, testing, and/or deploying a piece of software or a computer program that may not exist before the creation of the software. For example, the software creation task may cause a new software system to be created, or may cause a new software function to be added to an existing software system or a computing platform. A software update task may include, for example, a task to update a piece of software or a computer program. The software update task may cause updates to a piece of software or a computer program that may have already been created. For example, the software update task may cause modification of one or more features of a piece of software or a computer program, or may cause additions or other changes to a software function. A software deletion task may include, for example, a task to delete a piece of software or a computer program. The software deletion task may cause the removal of a piece of software, a computer program, or a software function.

Disclosed embodiments may include providing the software generation task to a language model in step 312. A language model may refer to, for example, a model of a natural language. The language model may include, for example, a probabilistic model, a machine learning model, a large language model (LLM) (e.g., GPT™, Gemini™, Microsoft Copilot™, Google Bard™, Claude™, etc.), or any other type of model or operation associated with a natural language. The language model may be in any desired form, such as a statistical model (e.g., a word n-gram language model, an exponential language model, or a skip-gram language model) or a neural model (e.g., a recurrent neural network-based language model or a LLM). In some examples, the language model may include a LLM with artificial neural networks, transformers, and/or other desired machine learning architectures. In some embodiments, the language model may include a trained language model. The language model may be trained using, for example, supervised learning, self-supervised learning, semi-supervised learning, unsupervised learning, and/or reinforcement learning. In some examples, the language model may be pre-trained to generally understand a natural language, and the pre-trained language model may be fine-tuned for software development. For example, the pre-trained language model may be fine-tuned for software generation tasks based on training data of descriptions associated with software generation tasks, and the fine-tuned language model may be used to receive and process the identified software generation task. In some examples, the language model may include generative pre-trained transformers (GPT) or other types of generative artificial intelligence configured to generate human-like content.

Providing the software generation task to the language model in step 312 may include, for example, inputting the software generation task to the language model. For example, a description of the software generation task and/or an indication of the nature of the software generation task (e.g., an indication that the description is a task to generate software) may be sent or input to the language model. For example, a computing device (e.g., the user device 112) may send, to a language model (e.g., executed or implemented by one or more of the server devices 114A, 114B, 114C), the software generation task entered by a user.

Disclosed embodiments may include identifying, from the language model, a plurality of queries associated with specific attributes of the software generation task in step 314. After the software generation task is provided to the language model, the language model may be prompted to generate a plurality of queries associated with specific attributes of the software generation task. For example, a question or prompt may be posed to the language model, and the question or prompt may ask the language model to generate one or more queries or questions to ask the user (e.g., software developer) to enrich the description of the software generation task and/or to better understand the software generation task. For example, after providing the software generation task to the language model, a computing device (e.g., the user device 112) may send, to the language model, a question that may ask the language model to generate the queries associated with specific attributes of the software generation task. The question sent to the language model may include, for example, "what questions would be asked about this software generation task, in order to understand the software generation task better?" In response to this question, the language model may generate a list of one or more queries associated with specific attributes of the software generation task.

In some examples, the interaction with the language model for the reconstruction of the software generation task may include a dialogue between the user and the language model (e.g., a back-and-forth conversation), that may enable the language model to receive feedback from the user regarding the quality and/or relevancy of the queries suggested by the language model as part of the reconstruction (e.g., to achieve an optimization of the language model). For example, for each of the queries provided by the language model, the user may be allowed to comment on the query or provide feedback on the query. The comment or feedback may be in any desired format, such as a thumb-up or thumb-down indication, a rating indicating quality or relevancy (e.g., a numerical rating), or a textual or descriptive comment, among others. The comment or feedback provided by the user may further be used to train and/or update the language model using reinforcement leaning, feedback loops, and/or other suitable techniques.

Disclosed embodiments may include creating, based on the software generation task and responses to the plurality of queries, a reconstructed software generation task in step 316. After the language model provides the plurality of queries associated with specific attributes of the software generation task, the user (e.g., software developer) may provide responses to the plurality queries. For example, a computing device (e.g., user device 112) may receive the plurality of queries generated by the language model, and may cause the plurality of queries to be displayed to the user via a user interface. The user interface may be configured to allow the user to enter the response to each of the plurality of queries. The responses to the plurality of queries may be provided to the language model. The language model may be asked to provide a summary of the responses to the plurality queries, and/or to provide a reconstructed software generation task based on the software generation task and the responses to the plurality of queries. Additionally or alternatively, a natural language processing program (e.g., different from the language model) may be used to create the reconstructed software generation task based on the software generation task and the responses to the plurality of queries.

In some embodiments, the reconstructed software generation task may be a more specific version of the software generation task. For example, the language model may be asked to summarize the responses to the plurality of queries and to update the software generation task with the summarized information to generate the reconstructed software generation task. In some embodiments, the reconstructed software generation task may include a plurality of requirements associated with software development. The plurality of requirements associated with software development may indicate, for example, required components or features of a piece of software in development. In some examples, the plurality of requirements associated with software development may not specify the security aspects of software development. In some examples, the plurality of requirements associated with software development may specify the security aspects of software development.

Figure 4:
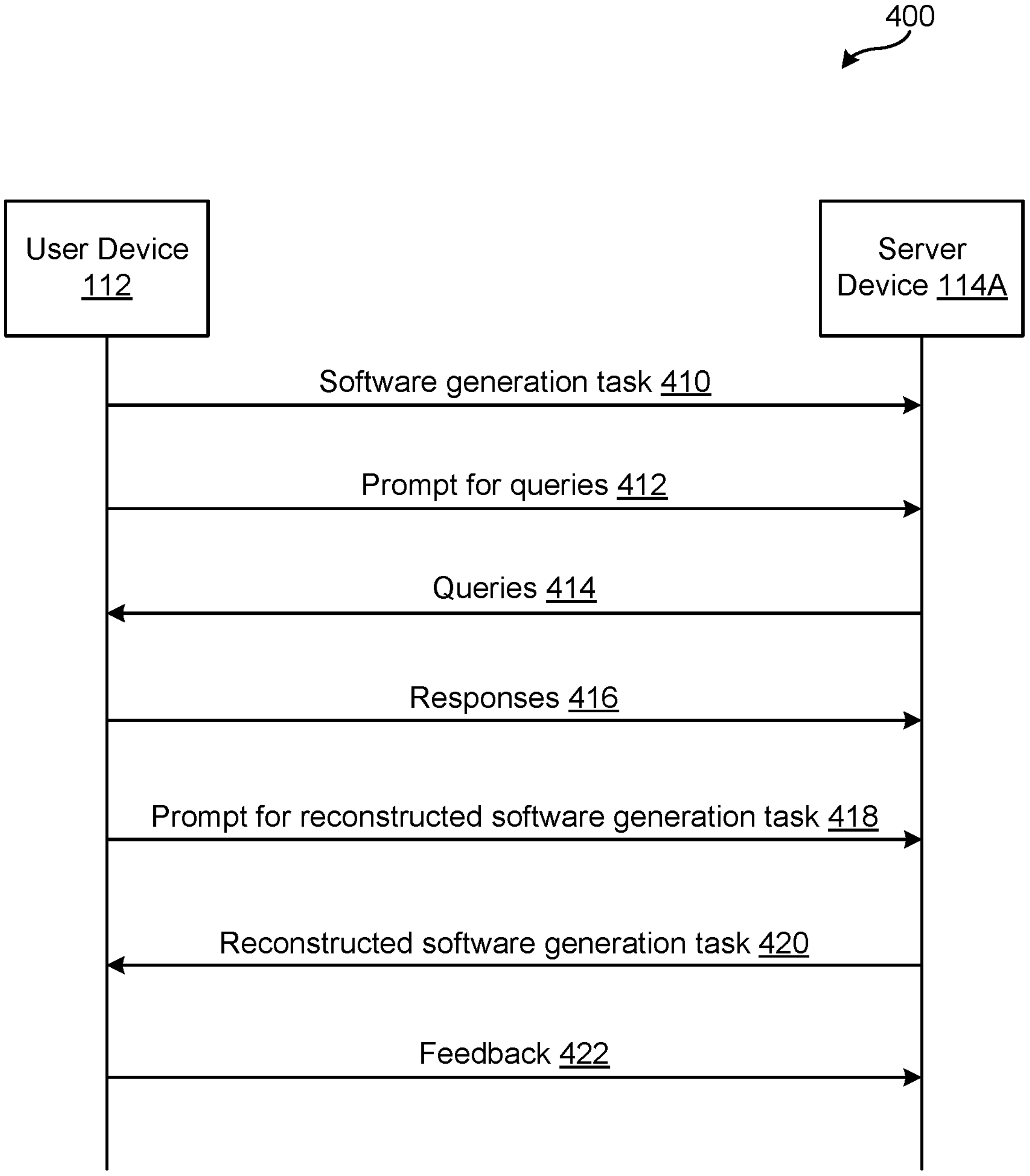
FIG. 4 shows example processes for creating a reconstructed software generation task, consistent with some embodiments of the present disclosure.

FIG. 4 shows example processes 400 for creating a reconstructed software generation task, consistent with some embodiments of the present disclosure. This figure is discussed here, and then the discussion returns to FIG. 3. With reference to FIG. 4, a user (e.g., a software developer) may enter a software generation task (e.g., as discussed above) into a computing device (e.g., the user device 112) via a user interface for transmission to a language model (e.g., implemented or executed by the server device 114A). In step 410, the computing device (e.g., the user device 112) may transmit the software generation task to the language model. In step 412, the user device 112 may transmit, to the language model at server device 114A, a prompt for queries associated with specific attributes of the software generation task.

In step 414, in response to the prompt, the language model may provide, to the user device 112, one or more queries associated with specific attributes of the software generation task. After receiving the one or more queries, the user device 112 may display the one or more queries to the user. The user may enter one or more responses to the one or more queries into the user device 112 (e.g., via a user interface). In step 416, the user device 112 may transmit, to the language model, the one or more responses to the one or more queries. In step 418, the user device 112 may transmit, to the language model, a prompt for a reconstructed software generation task.

In response to the prompt for a reconstructed software generation task, and based on the one or more responses to the one or more queries and/or the software generation task, the language model may create the reconstructed software generation task. In step 420, the language model may provide, to the user device 112, the reconstructed software generation task. The user may review the reconstructed software generation task displayed by the user device 112, and may provide feedback on the reconstructed software generation task. In step 422, the user device 112 may transmit, to the computing device implementing or executing the language model, the feedback provided by the user. The feedback may be used to train, update, and/or fine-tune the language model.

Returning to FIG. 3, disclosed embodiments may include assigning, based on a machine learning model, one or more security labels to the reconstructed software generation task in step 318. In some embodiments, the machine learning model may include the language model, another language model, or a classification model. For example, the machine learning model may include the language model that is used to receive the software generation task and/or to provide the plurality of queries associated with specific attributes of the software generation task. As another example, the machine learning model may include another language model different from the language model that is used to receive the software generation task. As another example, the machine learning model may include a classification model. A classification model may refer to, for example, a model or operation configured to classify a piece of input information with a corresponding category, group, or label. The classification model may include, for example, an artificial neural network, a logistic regression algorithm, a naive Bayes classifier, a k-nearest neighbors algorithm, a decision tree algorithm, a support vector machine, a random forest model, or any other suitable model or operation for classification. The machine learning model may be trained using, for example, supervised learning, self-supervised learning, semi-supervised learning, unsupervised learning, and/or reinforcement learning.

The machine learning model may be configured to receive the reconstructed software generation task as input, and to output one or more security labels for the reconstructed software generate task. The security labels may refer to, for example, any type of category, classification, or grouping related to security of software. In some examples, the security labels may include risk categories associated with software security, or security categories. For example, for a task to generate a web application, the security labels may include broken access control, cryptographic failures, injection, insecure design, security misconfiguration, vulnerable and outdated components, identification and authentication failures, software and data integrity failures, security logging and monitoring failures, server-side request forgery, and/or any other suitable category.

Assigning one or more security labels to the reconstructed software generation task in step 318 may include, for example, providing the reconstructed software generation task to the machine learning model as input, and assigning by the machine learning model the one or more security labels to the reconstructed software generation task as output. For example, the machine learning model may include a language model (e.g., generative pre-trained transformers), and the reconstructed software generation task may be input to the language model with a prompt or question to ask the language model to produce security labels relevant to the reconstructed software generation task and/or to indicate the degree of relevancy of each produced security label to the reconstructed software generation task.

As another example, the machine learning model may include a classification model, and the reconstructed software generation task may be input to the classification model, which may cause the classification model to produce security labels relevant to the reconstructed software generation task and/or to indicate the degree of relevancy of each produced security label to the reconstructed software generation task.

The training of the machine learning model may be based on various types of suitable training data. For example, the training data may include sample descriptions of tasks to generate software, and security labels for each sample description (e.g., the security labels for the sample description may be manually assigned by a person). In some examples, the training data may be based on data retrieved from open sources (e.g., the public internet). As an example, a publicly accessible developer platform may store and manage computer program code and associated documentation, metadata, or information. The data stored by the developer platform may include descriptions of software features, and their corresponding security labels or security-related information (e.g., which may be assigned to the software features by software developers). The sample pairs of the software feature description and the security labels retrieved from the developer platform may be used as training data for the machine learning model. Additionally or alternatively, the training data for the machine learning model may be obtained from other desired sources. Based on the training data, the machine learning model may be trained, fine-tuned, and/or updated to produce one or more security labels for the reconstructed software generation task that the machine learning model may receive as input.

In some examples, the security labels may additionally or alternatively be assigned to the reconstructed software generation task by the machine learning model based on industry standards and best practices for security in software development, or organization best practices for software security. The industry standards and best practices for software security may include, for example, the Open Worldwide Application Security Project (OWASP)™ Top 10 Web Application Security Risks, the OWASP Application Security Verification Standard (ASVS)™, Cloud Security Alliance (CSA)™ Security Trust Assurance and Risk (STAR) Registry™, the CSA Consensus Assessment Initiative Questionnaire (CAIQ)™, MITRE ATT&CK™, and/or other sources. The organization best practices for software security may include, for example, best practices for software security internal to an enterprise organization associated with the reconstructed software generation task (e.g., an organization that initiated or is responsible for implementing the reconstructed software generation task).

For example, a data dictionary or corpus of security labels may be determined based on the industry standards and best practices for security in software development, or organization best practices for software security. The data dictionary or corpus may include labels that may be selected from to assign to the reconstructed software generation task. In some examples, the industry standards and best practices for security in software development, or organization best practices for software security, may include categories, groups, or labels related to software security, and the categories, groups, or labels may be added to or included in the data dictionary or corpus. In some examples, the industry standards and best practices for security in software development, or organization best practices for software security may include indications of mappings between descriptions of software generation and corresponding security labels. The mappings may be used to train and/or update the machine learning model.

In some examples, for each security label assigned by the machine learning model to the reconstructed software generation task, a user may be allowed to provide feedback on the security label (e.g., regarding the quality or accuracy of the security label for the reconstructed software generation task). The user feedback may be used to train and/or update the machine learning model (e.g., to achieve an optimization of the machine learning model). For example, for each of the security labels assigned by the machine learning model, the user may be allowed to comment on the security label or provide feedback on the security label. The comment or feedback may be in any desired format, such as a thumb-up or thumb-down indication, a rating indicating quality or relevancy (e.g., a numerical rating), or a textual or descriptive comment, etc. The comment or feedback provided by the user may be used to train and/or update the machine learning model using reinforcement leaning, feedback loops, and/or other suitable techniques.

Disclosed embodiments may include determining, using the machine learning model, at least one relevancy score for the one or more security labels in step 320. In some embodiments, the at least one relevancy score may indicate a degree of relevancy or prioritization of the one or more security labels to the reconstructed software generation task. The relevancy score may include any type of indication of degree, such as a numeric value, a percentage, a ratio, a fraction, a number, a decimal, or any other desired indication of degree. Based on receiving the reconstructed software generation task as input, the machine learning model may produce a relevancy score for each of the one or more security labels. Each relevancy score may indicate a degree of relevancy or prioritization of the corresponding security label to the reconstructed software generation task. For example, the machine learning model may include a language model, which may be prompted or asked (e.g., by a question posed to the language model) to generate the relevancy scores. As another example, the machine learning model may include a classification model, which may produce weights (e.g., the relevancy scores) for security labels (e.g., in the output layer or output nodes of the classification model).

In some embodiments, assigning the one or more security labels to the reconstructed software generation task may be based on the at least one relevancy score. For example, security labels as output by the machine learning model for the reconstructed software generation task may be removed from further consideration, use, or processing, if the relevancy scores of the security labels do not satisfy (e.g., meet or exceed) a threshold degree of relevancy or prioritization. As an example, the machine learning model may determine a plurality of security labels for the reconstructed software generation task. A first group of security labels of the plurality of security labels may have relevancy scores above a threshold, and a second group of security labels of the plurality of security labels may have relevancy scores below the threshold (e.g., indicating that the second group may have low, minimum, or no relevancy or prioritization to the reconstructed software generation task). Based on the comparison of the relevancy scores with the threshold, the first group of security labels may be assigned to the reconstructed software generation task as the assigned one or more security labels, and the second group of security labels may be removed from further consideration, use, or processing.

Disclosed embodiments may include determining one or more prioritization scores for one or more security rules based on the one or more security labels. A security rule may refer to, for example, any type of instruction, direction, guidance, command, or requirement associated with security of software. The one or more security rules may be implemented or addressed by a software developer for the reconstructed software generation task. In some examples, industry standards and best practices for security in software development, or organization best practices for software security, may be sources for the determination of the security rules. The industry standards and best practices for software security may include, for example, the Open Worldwide Application Security Project (OWASP)™ Application Security Verification Standard (ASVS)™, the Cloud Security Alliance (CSA)™ Security Trust Assurance and Risk (STAR) Registry™, the CSA Consensus Assessment Initiative Questionnaire (CAIQ)™, MITRE ATT&CK™, and/or other sources. The organization best practices for software security may include, for example, best practices for software security internal to an enterprise organization associated with the reconstructed software generation task (e.g., an organization that initiated or is responsible for implementing the reconstructed software generation task).

Disclosed embodiments may include determining the one or more security rules based on the one or more security labels. For example, a model (e.g., a machine learning model) or other operations may be used to determine the one or more security rules based on the one or more security labels assigned to the reconstructed software generation task. The one or more security rules may stem from, derive from, or be associated with the one or more security labels (e.g., security categories). In some examples, a security rule may be designated to address one or more issues that may be classified under one or more security labels (e.g., security categories).

In some embodiments, determining the one or more security rules based on the one or more security labels may include mapping each of a plurality of security labels to a corresponding set of one or more security rules. For example, a model (e.g., a machine learning model) or other operations may be configured to map each of the plurality of security labels to the corresponding set of one or more security rules. In some examples, the model may be trained using industry standards and best practices for software security and/or organization best practices for software security.

As one example, a language model may be trained and/or fine-tuned using industry standards and best practices for software security and/or organization best practices for software security. Additionally or alternatively, the language model may be configured with prompt engineering for structuring text that may be interpreted and understood by the language model. The language model may be provided with the one or more security labels as input, and may be asked to produce the one or more security rules corresponding to the one or more security labels. As another example, a mapping may be used to map the one or more security labels to the one or more security rules for the reconstructed software generation task. The mapping may include a correspondence between each security label and a set of one or more security rules. The mapping may be generated or updated, for example, based on input or feedback from a user (e.g., a security expert or a security reviewer), based on classification of various security rules with security labels by a classifier (e.g., a classification model), and/or based on other suitable information or data. In some examples, the industry standards and best practices for software security and/or organization best practices for software security may include indications of mappings between security labels and corresponding security rules, and the mappings may be used to train and/or update a model for determining security rules based on security labels (e.g., a machine learning model, a language model, or any other suitable model).

In some examples, a prioritization score may be determined for each of the one or more security rules. The prioritization score for a security rule may be based on (e.g., may be same as, be proportional to, or correspond to) the relevancy score of a security label from which the security rule is mapped. In some examples, if two or more security labels map to a single security rule (e.g., the same one security rule, or a deduplicated security rule from multiple security rules having the same or similar subject matter in relation to security), the prioritization score for the security rule may be same as, be proportional to, or correspond to a combination of the relevancy scores for the two or more security labels. In some examples, the prioritization score may additionally or alternatively be based on a historical risk analysis, as described herein. For example, the prioritization score as determined based on the relevancy score(s) may be updated using, be combined with, or incorporate, score(s) based on the historical risk analysis, as described herein.

A prioritization score for a security rule may refer to, for example, any type of indication of prioritization, such as a numeric value, a ranking, a percentage, a ratio, a fraction, a number, a decimal, or any other desired indication of prioritization. Determining the one or more prioritization scores for the one or more security rules may include determining a prioritization score for each of the one or more security rules. In some examples, determining the prioritization score for a security rule may be based on the relevancy score determined for the security label from which the security rule is mapped. For example, the prioritization score for the security rule may be same as, be proportional to, or correspond to the relevancy score. Additionally or alternatively, the prioritization score for the security rule may be determined based on other suitable factors, such as a historical risk analysis, as discussed below.

Disclosed embodiments may include performing a historical risk analysis for the reconstructed software generation task. The historical risk analysis may refer to, for example, any type of analysis of historical data associated with the software generation task, the reconstructed software generation task, or entities, users, or groups related to the software generation task or the reconstructed software generation task, in relation to security risks. In some embodiments, the historical risk analysis may include analyzing historical activity of a user or group associated with the software generation task or the reconstructed software generation task. The user or group associated with the software generation task or the reconstructed software generation task may include, for example, the software developer who initiated or is responsible for implementing the software generation task or the reconstructed software generation task, a software development team which the software developer belongs to or is associated with, a software development team that initiated or is responsible for implementing the software generation task or the reconstructed software generation task, or any other user or group related to the software generation task or the reconstructed software generation task. The historical activity of the user or group may indicate, for example, a number of software development projects that the user or group worked on in the past, and/or the date and time, the encountered security issues or risks (if any), and/or other details of each of the software development projects. Additionally or alternatively, the historical risk analysis may include analyzing other types of historical data, such as historical data associated with software generation tasks of a similar or same type as the software generation task or the reconstructed software generation task (e.g., a type of task to generate a password retrieval program). In some examples, the historical activity may be stored in a data storage, memory, or database for retrieval and use for the historical risk analysis.

Disclosed embodiments may include assigning one or more scores based on the historical risk analysis. The one or more scores based on the historical risk analysis may include, for example, any type of indication of degree, such as a numeric value, a percentage, a ratio, a fraction, a number, a decimal, or any other desired indication of degree. In some embodiments, the one or more scores based on the historical risk analysis may indicate (e.g., reflect) a number of past instances of a security issue for a user or group associated with the software generation task or the reconstructed software generation task. The user or group associated with the software generation task or the reconstructed software generation task may include, for example, the software developer who initiated or is responsible for implementing the software generation task or the reconstructed software generation task, a software development team which the software developer belongs to or is associated with, a software development team that initiated or is responsible for implementing the software generation task or the reconstructed software generation task, or any other user or group related to the software generation task or the reconstructed software generation task. The security issue for the user or group associated with the software generation task or the reconstructed software generation task may include, for example, any concern, problem, risk, issue, or matter related to software security.

In some examples, a plurality of scores may be determined based on the historical risk analysis (e.g., for a plurality of security issues), and each of the plurality of scores may indicate a number or quantity of past instances of a particular security issue associated with the user or group, or a severity level of a particular past security issue. For example, a computing device (e.g., one or more of the server devices 114A, 114B, 114C) may determine (e.g., based on the historical activity of the user or group) a number of past instances or occurrences of a security issue of broken authentication in software development or developed software associated with the user or group, a number of past instances or occurrences of a security issue of cryptography in software development or developed software associated with the user or group, a number of past instances or occurrences of a security issue of access control in software development or developed software associated with the user or group, or any other desired score or metric.

In some embodiments, the scores based on the historical risk analysis may be based on at least one of: an identified user, an identified organization, or an identified project. These factors may be involved in the historical risk analysis. For example, the identified user may include a user who initiated or is responsible for implementing the software generation task or the reconstructed software generation task. The identified organization may include, for example, an organization that initiated or is responsible for implementing the software generation task or the reconstructed software generation task. The identified project may include, for example, a project which the software generation task or the reconstructed software generation task belongs to or is associated with. In some examples, the scores based on the historical risk analysis may be determined based on historical data associated with one or more of: the identified user, the identified organization, or the identified project.

In some examples, the security issues involved in calculating the scores based on the historical risk analysis may be same as, may correspond to, or may map to the security labels or the security rules (for example, so that a score based on the historical risk analysis for a security issue may be combined with a score associated with the corresponding security label or a score associated with the corresponding security rule for determining a prioritization score as described below). A mapping between the security issues and the security labels may be constructed in any desired manner. For example, the mapping may link together security issue(s) and security label(s) that have the same or similar subject matter in relation to security. A mapping between the security issues and the security rules may be constructed in any desired manner. For example, the mapping may link together security issue(s) and security rule(s) that have the same or similar subject matter in relation to security. In some examples, a security expert or person having knowledge of software security may create, update, modify, or provide input or feedback for, the mappings.

In some embodiments, determining the one or more prioritization scores may include a combination based on the at least one relevancy score and the one or more scores based on the historical risk analysis. For example, a prioritization score for a security rule may be determined by combining a relevancy score (for a security label from which the security rule is mapped) and a score based on the historical risk analysis (for a security issue that is mapped to the security rule or the security label). In some embodiments, the combination may include a weighted sum of the relevancy score and the score based on the historical risk analysis. The weights applied to the relevancy score or the score based on the historical risk analysis may be configured in any desired manner (e.g., a weight of one (1) for the relevancy score and a weight of 0.5 for the score based on the historical risk analysis, or a weight of 0.75 for the relevancy score and a weight of 1.2 for the score based on the historical risk analysis). In some examples, the weights may be configured so that one of the two scores may not be considered to calculate the prioritization score (e.g., when a weight of zero is applied to one of the two scores).

In some embodiments, the combination may include applying a first mapping to a relevancy score to generate a first mapped value, applying a second mapping to a score based on the historical risk analysis to generate a second mapped value, and combining the first mapped value and the second mapped value to generate a prioritization score. The prioritization score may be for a security rule that may correspond to or map to the security label associated with the relevancy score and the security issue associated with the score based on the historical risk analysis. The first mapping and the second mapping may include, for example, any type of suitable function or operation that may associate an input value with a corresponding output value, such as a linear function, a piecewise function, a polynomial function, an exponential function, a logarithmic function, or any other desired mapping. In some examples, the combining of the first mapped value and the second mapped value may include a weighted sum of the first mapped value and the second mapped value. Additionally or alternatively, the prioritization score may be calculated based on the relevancy score, the score based on the historical risk analysis, and/or any other desired score or metric.

In some embodiments, determining the one or more prioritization scores may include analyzing, using a model, one or more of the one or more scores based on the historical risk analysis, industry best practices for security, organization best practices for security, or an input from a user. In some examples, the model may consider all of the factors to determine the prioritization scores. In some examples, the model may consider some of the factors to determine the prioritization scores. For example, the model may consider the industry best practices for security and the input from the user (e.g., a security expert user) to determine the prioritization scores. The input from the user may include feedback of a security administrator on previous security actions associated with software development. In some embodiments, the one or more prioritization scores may be based on at least one of a task classification score or a historical risk analysis score. The task classification score may include, for example, a composite analysis of the two types of best practices (e.g., industry best practices for software security, or organization best practices for software security) and/or a user input. In some examples, the task classification score may include a relevancy score for a security label for the reconstructed software generation task. The historical risk analysis score may include, for example, a score based on the historical risk analysis for the reconstructed software generation task.

Disclosed embodiments may include generating, based on the one or more prioritization scores, at least one security action for the reconstructed software generation task in step 322. In some examples, generating the at least one security action may be based on applying the assigned one or more scores based on the historical risk analysis. For example, the assigned one or more scores based on the historical risk analysis may be applied to calculate the prioritization scores for the security rules, and the prioritization scores may be used to generate the at least one security action.

A security action may refer to, for example, any type of activity, instruction, or operation associated with security of software. The at least one security action may be based on the one or more security rules determined for the reconstructed software generation task (e.g., in view of the one or more prioritization scores for the one or more security rules). For example, the at least one security action may be based on, indicate, or include some or all of the one or more security rules determined for the reconstructed software generation task. In some embodiments, the at least one security action may include a plurality of security actions presented in accordance with a prioritization based on the one or more prioritization scores. For example, the system may rank the one or more security rules determined for the reconstructed software generation task according to the one or more prioritization scores (e.g., a listing of the security rules ranked from high to low, which may be presented to a user, for example, via a user interface). In some examples, the plurality of security actions presented in accordance with a prioritization may be based on, indicate, or include the ranked security rules. In some examples, the plurality of security actions presented in accordance with a prioritization may additionally or alternatively include practical instructions (e.g., that may be provided to a software developer) determined based on the ranked security rules, and/or a reduction to practice of selected security rules.

For example, the security rules for the reconstructed software generation task may be updated, modified, enriched, and/or supplemented to generate security actions.

In some examples, a language model, a machine learning model, or other suitable operations may be used to analyze, update, modify, enrich, reproduce, and/or otherwise generate one or more security actions based on the security rules. A security action as generated based on its corresponding security rule may inherit the prioritization score of the security rule. For example, a prioritization score for a security action may be the same as, be proportional to, or correspond to the prioritization score of the security rule corresponding to the security action. The prioritization score for the security action may be used to indicate a level of prioritization for the security action in relation to other security actions, or may be used to rank the security action in relation to other security actions.

For example, a security rule may include enforcing input validation on a trusted service layer. A security action corresponding to (e.g., generated based on) the security rule may include actions to identify the expected format and characteristics of the input data, such as email addresses or usernames, and create regular expressions that match the identified requirements and use them in the computer program code.

As another example, a security rule may include verifying that a code analysis tool is in use that can detect potentially malicious code, such as time functions, unsafe file operations, and network connections. A security action corresponding to (e.g., generated based on) the security rule may include implementing a continuous integration (CI) or continuous deployment (CD) pipeline that includes the integration of the Checkmarx SAST™ tool to identify potential malicious code patterns.

As another example, a security rule may include verifying that the application source code and third party libraries do not contain code enabling unauthorized outbound network communications, such as "phone home" or data collection capabilities. Where such functionality exists, the security rule may include obtaining the user's permission for it to operate before collecting any data. A security action corresponding to (e.g., generated based on) the security rule may include conducting an automated code review, using, for example, the Checkmarx SAST™ tool for source code scanning and the Snyk Open Source™ tool for third party review. The security action may include focusing the configuration of the scanning tools to inspect code segments and known vulnerabilities that involve such outbound network connections, data transmission, or interactions with external servers. The security action may also involve implementing a notification mechanism within the application to inform users about the data collection activities, and providing clear details on what information will be collected and transmitted.

In some examples, the generation of a security action based on a security rule may use a machine learning model or a language model, trained or fine-tuned for generating security actions based on security rules. Additionally or alternatively, a mapping may be used to generate a security action based on a security rule. The model or mapping may be based on data sources, such as industry standards and best practices for security in software development, or organization best practices for software security. Additionally or alternatively, the model or mapping may be configured by a security expert or any person having knowledge of software security. In some examples, the model or mapping may be updated based on feedback provided by a user (e.g., the security person or a software developer) regarding the output produced by the model or mapping. In some examples, a security action may include a security rule without transformation or change. For example, the security actions based on the security rules may include a listing and/or presentation of the security rules as prioritized or ranked (e.g., without updating, modifying, enriching, supplementing, and/or changing the security rules to include additional, alternative, or more concrete action items). The listing and/or presentation of the security rules as prioritized or ranked may be presented to a user (e.g., a software developer) as security actions, for example, via a user interface.

In some examples, generating the at least one security action in step 322 may include mapping a security rule to a security action, or combining two or more security rules into a security action. For example, if two or more security rules are redundant or duplicate or have the same or similar subject matter in relation to software security, the two or more security rules may be combined into a single security action (e.g., to deduplicate the security rules). When the two or more security rules are combined, their associated prioritization scores may also be combined (e.g., summed, or combined in any other desired manner) to generate a new prioritization score for the resulting security action. Thus, one security action may be relevant to more than one security rule. For example, a relatively low prioritized security rule may be covered as a security action just because the security action covers a higher prioritized security rule having the same or similar subject matter in relation to software security.

In some embodiments, generating the at least one security action in step 322 may include determining whether each of the one or more prioritization scores satisfies a threshold, and defining, for each of the one or more security rules whose prioritization score satisfies the threshold, one or more security actions. The threshold may be configured with any desired value. As one example, the threshold may be configured with such a value that security rules with prioritization scores indicating low, minimum, or no significance may not be included as security actions. In some examples, the threshold may be configured based on key performance indicators or other performance measurement objectives or goals of an organization or entity associated with the reconstructed software generation task. The security rules having the satisfying prioritization scores may be included as security actions. The security actions may be associated with the one or more security rules. The security actions may be designated for providing, covering, or fulfilling the security requirements expressed by a selected prioritized security rule. Additionally or alternatively, each of the one or more security rules whose prioritization score satisfies the threshold may be associated with one or more security actions.

Disclosed embodiments may include implementing the at least one security action based on a code generation engine. A code generation engine may refer to, for example, any tool, technique, system, or mechanism configured to generate computer program code (e.g., source code, software instructions, and/or the like). The code generation engine may be configured to parse natural language (e.g., the reconstructed software generation task and the at least one security action for the reconstructed software generation task) and generate computer program code in response. In some examples, the code generation engine may include a machine learning model or other structure of artificial intelligence. For example, the code generation engine may include generative pre-trained transformers fine-tuned for use in programming applications. Additionally, the computer program code generated by the code generation engine may be processed by a compiler or other suitable tools or systems to generate the executable form of the computer program (e.g., machine code, machine instructions, executable instructions, and/or the like), which may be executed by a computing device to implement the software described in the reconstructed software generation task. In some examples, the computer program code generated by the code generation engine may be transmitted to and/or used by an integrated development environment (IDE) for processing, execution, and/or implementation.

As an example, the code generation engine may be executed or implemented by a computing device (e.g., the code generation device 118). The reconstructed software generation task and/or the at least one security action for the reconstructed software generation task may be provided as input to the code generation engine. In response, the code generation engine may generate computer program code for the reconstructed software generation task. The generated computer program code may include code that may implement or represent the at least one security action. The generated computer program code may be used to implement the software described in the reconstructed software generation task. The generated computer program code may embed recommended security safeguards based on the at least one security action.

In some examples, the at least one security action may be displayed (e.g., via a user interface) to the user (e.g., a software developer) together with the description of the software generation task and/or the reconstructed software generation task. Additionally or alternatively, the at least one security action as displayed to the user may be in a "to-do list" format that may allow the user to mark a security action as completed or not completed, to help the user implement the at least one security action.

Disclosed embodiments may include, based on user feedback provided by a software developer or a security reviewer, training or updating at least one of: the language model, the machine learning model, a model configured to map security labels to security rules, a model configured to determine the one or more prioritization scores, or a model configured to conduct a historical risk analysis. A software developer may include, for example, any person involved in developing software. A security reviewer may include, for example, a security expert or any person having knowledge of software security. In some examples, a software developer may use a computing device (e.g., the user device 112) to provide the feedback, and a security reviewer may use a computing device (e.g., the security review device 116) to provide the feedback. The user feedback that may be used to train or update the models may include feedback by the software developer or the security reviewer on the output produced by the models (e.g., in view of the corresponding input to the models).

For example, the user feedback may include feedback on the quality, accuracy, and/or relevancy of the queries associated with specific attributes of the software generation task produced by the language model (e.g., the queries based on which the reconstructed software generation task may be generated), feedback on the accuracy of the reconstructed software generation task, feedback on the accuracy of the assigned one or more security labels for the reconstructed software generation task and/or the associated relevancy scores, feedback on the accuracy of the one or more security rules determined for the reconstructed software generation task, feedback on the accuracy of the one or more prioritization scores for the one or more security rules, feedback on the one or more scores based on the historical risk analysis for the reconstructed software generation task, feedback on the computer program code generated for the reconstructed software generation task, feedback associated with generating the at least one security action, and/or any other suitable feedback by the software developer, the security reviewer, or other person. In some examples, feedback by a security reviewer (e.g., a security expert) or software developer may be provided and used for training the models as described herein and improving the outcomes or output of the models during different phases of the processes. For example, the feedback may include how good or accurate the reconstructed software generation task is, how good or useful the computer program code automatically generated for the reconstructed software generation task is, how relevant or accurate the security actions provided by the system are, and/or any other type of feedback that may be used to optimize the models.

Figure 5:
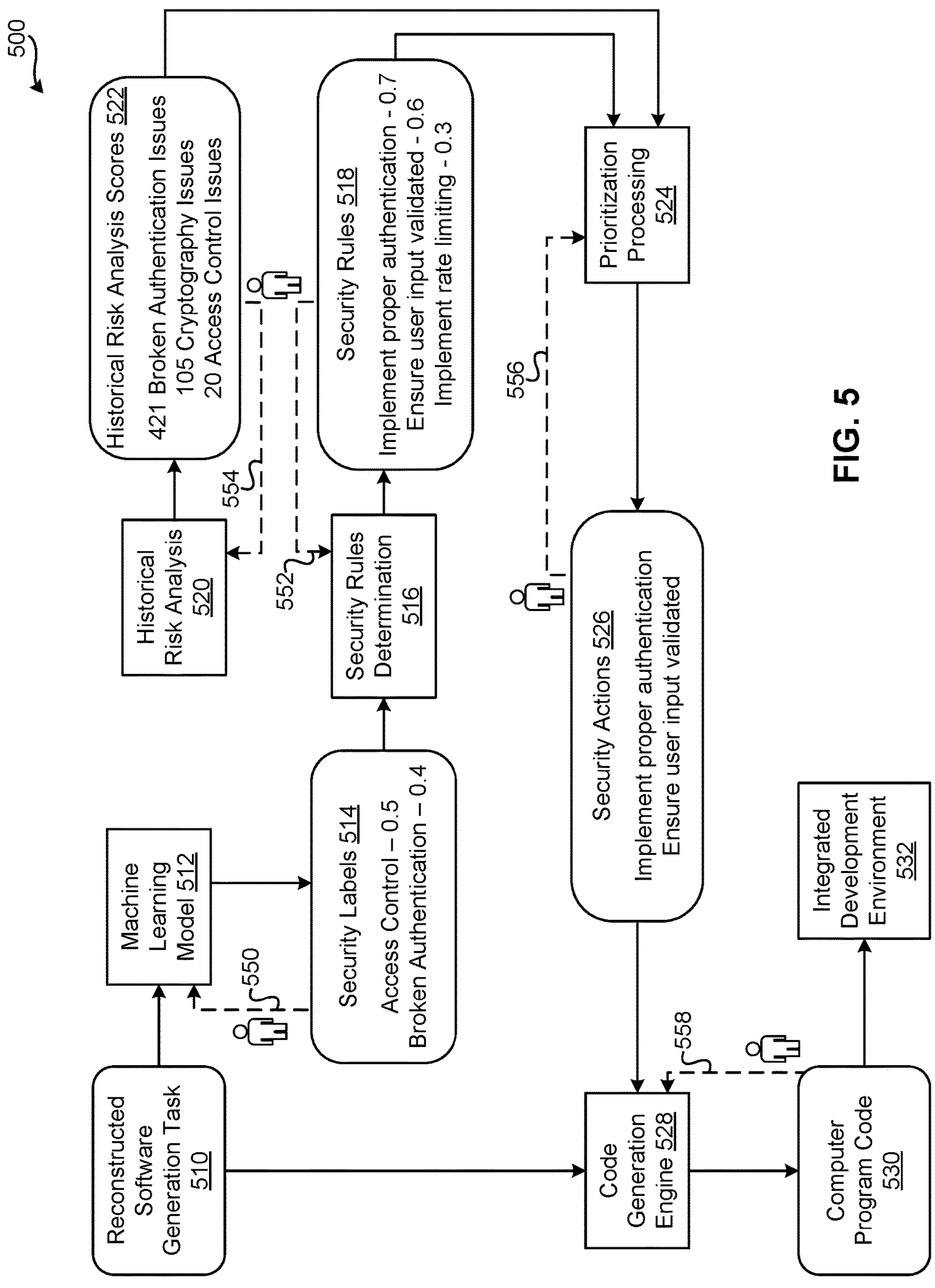
FIG. 5 shows example processes for interactively enhancing security in software development life cycles, consistent with some embodiments of the present disclosure.

FIG. 5 shows example processes 500 for interactively enhancing security in software development life cycles, consistent with some embodiments of the present disclosure. With reference to FIG. 5, a reconstructed software generation task 510 may be provided to a machine learning model 512 as input, which may in response assign security labels 514 to the reconstructed software generation task 510. The security labels 514 may include, for example, access control, broken authentication, and/or other security labels. Additionally, a relevancy score may be determined by the machine learning model 512 for each of the security labels 514 (e.g., a relevancy score of 0.5 for access control, and a relevancy score of 0.4 for broken authentication, etc.) reflecting the degree of relevance of the security label to the reconstructed software generation task.

The security labels 514 may be provided to security rules determination 516, for determining security rules for the reconstructed software generation task 510. In some examples, the reconstructed software generation task 510 may be additionally or alternatively provided to the security rules determination 516, for determining the security rules for the reconstructed software generation task 510. The security rules determination 516 may produce the security rules 518 for the reconstructed software generation task 510. For example, the security rules 518 may include a rule to implement proper authentication, a rule to ensure user input is validated, a rule to implement rate limiting, and/or other security rules. Additionally, a prioritization score may be determined for each of the security rules 518 (e.g., a prioritization score of 0.7 for the rule to implement proper authentication, a prioritization score of 0.6 for the rule to ensure user input validated, and a prioritization score of 0.3 for the rule to implement rate limiting, etc.). The prioritization scores for the security rules 518 may be determined based on the relevancy scores for the corresponding security labels 514.

A historical risk analysis 520 may be performed for the reconstructed software generation task 510, and may produce historical risk analysis scores 522. The historical risk analysis scores 522 may indicate, for example, 421 broken authentication issues, 105 cryptography issues, 20 access control issues, and/or other scores, associated with the reconstructed software generation task 510.

The security rules 518 (with the prioritization scores) and/or the historical risk analysis scores 522 may be provided to prioritization processing 524. Based on received input data, the prioritization processing 524 may determine and/or update prioritization scores for the security rules 518. In some examples, the prioritization processing 524 may use the input prioritization scores for the security rules 518 without considering the historical risk analysis scores 522.

In some examples, the prioritization processing 524 may update the input prioritization scores for the security rules 518 based on the historical risk analysis scores 522 (e.g., may update the input prioritization scores based on combining with or incorporating the historical risk analysis scores 522). Based on the determined or updated prioritization scores for the security rules 518, security actions 526 may be generated. For example, the security actions 526 may include those of the security rules 518 whose prioritization scores are above a threshold. For example, the security actions 526 may include "implement proper authentication," "ensure user input validated," and/or other security actions.

The reconstructed software generation task 510 and/or the security actions 526 may be provided to a code generation engine 528. The code generation engine 528 may in response produce computer program code 530. The computer program code 530 may be provided to an integrated development environment 532 for processing, execution, and/or implementation. In some examples, the computer program code embedding the security actions 526 may additionally or alternatively be generated by a human developer. In some examples, a human developer may generate a version of the computer program code embedding software functionalities, and the code generation engine 528 may suggest modifications, updates, changes, additions, and/or deletions used or required to address the security actions 526 suggested by the system in the version of the computer program code.

Additionally or alternatively, a software developer or a security reviewer (e.g., a security administrator) may provide feedback on the results produced by various components, and the feedback may be used to train, update, or fine-tune the components. For example, user feedback 550 on the security labels 514 may be used to train or update the machine learning model 512. User feedback 552 on the security rules 518 may be used to train or update the security rules determination 516. User feedback 554 on the historical risk analysis scores 522 may be used to train or update the historical risk analysis 520. User feedback 556 on the security actions 526 may be used to train or update the prioritization processing 524. User feedback 558 on the computer program code 530 may be used to train or update the code generation engine 528.

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways.

The disclosed embodiments may be implemented in a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant virtualization platforms, virtualization platform environments, trusted cloud platform resources, cloud-based assets, protocols, communication networks, security tokens and authentication credentials, and code types will be developed, and the scope of these terms is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments unless the embodiment is inoperative without those elements.

Although the invention has been described in conjunction with specific embodiments thereof, it is evident that many alternatives, modifications, and variations will be apparent to those skilled in the art. Accordingly, it is intended to embrace all such alternatives, modifications and variations that fall within the spirit and broad scope of the appended claims.

The invention claimed is:

1. A non-transitory computer readable medium including instructions that, when executed by at least one processor, cause the at least one processor to perform operations for interactively enhancing security in software development life cycles, the operations comprising:

identifying a software generation task;

providing the software generation task to a language model;

executing the language model to generate a plurality of queries associated with specific attributes of the software generation task;

creating, based on the software generation task and responses to the plurality of queries, a reconstructed software generation task;

assigning, based on a machine learning model, one or more security labels to the reconstructed software generation task;

determining one or more prioritization scores for one or more security rules based on the one or more security labels;

generating, based on the one or more prioritization scores, at least one security action for the reconstructed software generation task; and generating program code to implement the at least one security action.

2. The non-transitory computer readable medium of claim 1, wherein the operations further comprise determining, using the machine learning model, at least one relevancy score for the one or more security labels, wherein the at least one relevancy score indicates a degree of relevancy or prioritization of the one or more security labels to the reconstructed software generation task.

3. The non-transitory computer readable medium of claim 2, wherein assigning the one or more security labels to the reconstructed software generation task is based on the at least one relevancy score.

4. The non-transitory computer readable medium of claim 2, wherein the operations further comprise performing a historical risk analysis for the reconstructed software generation task.

5. The non-transitory computer readable medium of claim 4, wherein the historical risk analysis comprises analyzing historical activity of a user or group associated with the software generation task or the reconstructed software generation task.

6. The non-transitory computer readable medium of claim 4, wherein the operations further comprise assigning one or more scores based on the historical risk analysis.

7. The non-transitory computer readable medium of claim 6, wherein the one or more scores based on the historical risk analysis indicate a number of past instances of a security issue for a user or group associated with the software generation task or the reconstructed software generation task.

8. The non-transitory computer readable medium of claim 6, wherein determining the one or more prioritization scores comprises analyzing, using a model, one or more of: the one or more scores based on the historical risk analysis, industry best practices for security, organization best practices for security, or an input from a user.

9. The non-transitory computer readable medium of claim 1, wherein the software generation task includes at least one of: a software creation task, a software update task, or a software deletion task.

10. The non-transitory computer readable medium of claim 1, wherein the language model comprises a trained language model.

11. The non-transitory computer readable medium of claim 1, wherein the operations further comprise determining the one or more security rules based on the one or more security labels.

12. The non-transitory computer readable medium of claim 11, wherein determining the one or more security rules based on the one or more security labels comprises mapping each of a plurality of security labels to a corresponding set of one or more security rules.

13. The non-transitory computer readable medium of claim 1, wherein the at least one security action comprises a plurality of security actions presented in accordance with a prioritization based on the one or more prioritization scores.

14. The non-transitory computer readable medium of claim 1, wherein generating the at least one security action comprises:

determining whether each of the one or more prioritization scores satisfies a threshold; and defining, for each of the one or more security rules whose prioritization score satisfies the threshold, one or more security actions.

15. The non-transitory computer readable medium of claim 1, wherein the machine learning model comprises the language model, another language model, or a classification model.

16. A computer-implemented method for interactively enhancing security in software development life cycles, the method comprising:

identifying a software generation task;

providing the software generation task to a language model;

executing the language model to generate a plurality of queries associated with specific attributes of the software generation task;

creating, based on the software generation task and responses to the plurality of queries, a reconstructed software generation task;

assigning, based on a machine learning model, one or more security labels to the reconstructed software generation task;

determining one or more prioritization scores for one or more security rules based on the one or more security labels;

generating, based on the one or more prioritization scores, at least one security action for the reconstructed software generation task; and generating program code to implement the at least one security action.

17. The computer-implemented method of claim 16, wherein the reconstructed software generation task comprises a plurality of requirements associated with software development.

18. The computer-implemented method of claim 16, wherein the one or more prioritization scores are based on at least one of: a task classification score or a historical risk analysis score.

19. The computer-implemented method of claim 16, further comprising:

implementing the at least one security action based on a code generation engine.

20. The computer-implemented method of claim 16, further comprising:

based on user feedback provided by a software developer or a security reviewer, training or updating at least one of: the language model, the machine learning model, a model configured to map security labels to security rules, a model configured to determine the one or more prioritization scores, or a model configured to conduct a historical risk analysis.

* * * * *